(12) United States Patent
He (10) Patent No.: US 10,782,408 B2
(45) Date of Patent: Sep. 22, 2020

(54) CALIBRATION METHOD AND DEVICE BASED ON SINGLE-WAVELENGTH DOUBLE-LASER-TUBE PHASE MEASUREMENT

(71) Applicant: HONGKONG SNDWAY INSTRUMENT COMPANY LIMITED, Hong Kong (CN)

(72) Inventor: Gang He, Guangdong (CN)

(73) Assignee: HONGKONG SNDWAY INSTRUMENT COMPANY LIMITED, Hong Kong (CN)

( * ) Notice: Subject to any disclaimer, the term of this patent is extended or adjusted under 35 U.S.C. 154(b) by 390 days.

(21) Appl. No.: 15/740,804

(22) PCT Filed: Aug. 25, 2016

(86) PCT No.: PCT/CN2016/096769
§ 371 (c)(1),
(2) Date: Dec. 29, 2017

(87) PCT Pub. No.: WO2017/096957
PCT Pub. Date: Jun. 15, 2017

(65) Prior Publication Data
US 2018/0203118 A1    Jul. 19, 2018

(30) Foreign Application Priority Data
Dec. 10, 2015 (CN) .......................... 2015 1 0918222

(51) Int. Cl.
*G01C 3/08* (2006.01)
*G01S 17/36* (2006.01)
(Continued)

(52) U.S. Cl.
CPC .............. *G01S 17/36* (2013.01); *G01S 7/497* (2013.01); *G01S 7/4911* (2013.01); *G01S 7/4915* (2013.01); *G01S 7/4918* (2013.01)

(58) Field of Classification Search
CPC ........ G01S 17/36; G01S 7/497; G01S 7/4915; G01S 7/4918; G01S 7/4911
(Continued)

(56) References Cited

U.S. PATENT DOCUMENTS 6,100,540 A     8/2000   Ducharme et al.
6,876,441 B2 *  4/2005   Barker .................. G01S 7/4812
                                                       356/5.09
(Continued)

FOREIGN PATENT DOCUMENTS

CN    201514481 U    6/2010
CN    202770994 U    3/2013
(Continued)

*Primary Examiner* — Mark Hellner (57) ABSTRACT

A calibration method includes: (S1) generating an external light path via a laser automatic power control circuit through a high frequency modulation signal, sending the external light path to a measured target, reflecting the external light path back through the measured target and receiving the reflected external light path by a photoelectric receiving circuit; (S2) generating an internal light path via the laser automatic power control circuit through the high frequency modulation signal, directly sending the internal light path to the photoelectric receiving circuit, and receiving the internal light path through the photoelectric receiving circuit; and (S3) performing phase comparison between two paths of light waves respectively corresponding to the external light path and the internal light path received firstly and secondly by the photoelectric receiving circuit, and a reference phase signal through the photoelectric receiving circuit, calculating a distance phase, and outputting a signal whose base is eliminated.

4 Claims, 3 Drawing Sheets

(51) Int. Cl.
  *G01S 7/497* (2006.01)
  *G01S 7/4915* (2020.01)
  *G01S 7/4911* (2020.01)
  *G01S 7/4912* (2020.01)

(58) Field of Classification Search
  USPC .......................................................... 356/5.13
  See application file for complete search history.

(56) References Cited

U.S. PATENT DOCUMENTS 7,023,531 B2 * 4/2006 Gogolla .................. G01S 7/497
  356/5.01
8,692,981 B2 * 4/2014 Spruck .................. G01S 7/4915
  356/5.01

FOREIGN PATENT DOCUMENTS

| CN | 101581783 A | 4/2013 |
| CN | 103472454 A | 12/2013 |
| CN | 105093233 A | 11/2015 |
| CN | 104035099 A | 2/2017 |

\* cited by examiner

Fig. 3

CALIBRATION METHOD AND DEVICE BASED ON SINGLE-WAVELENGTH DOUBLE-LASER-TUBE PHASE MEASUREMENT

CROSS REFERENCE OF RELATED APPLICATION

This is a U.S. National Stage under 35 U.S.C 371 of the International Application PCT/CN2016/096769, filed Aug. 25, 2016, which claims priority under 35 U.S.C. 119(a-d) to CN 201510918222.6, filed Dec. 10, 2015.

BACKGROUND OF THE PRESENT INVENTION

Field of Invention

The present invention relates to a technical field of photoelectric distance measurement, and more particularly to a calibration method and a calibration device based on single-wavelength double-laser-tube phase measurement.

Description of Related Arts

Mankind has always been proud of the disclosure of laser which is accurate, fast, easy to use and strong in anti-interference. Therefore, the developed laser technology solves some technical barriers which are unable to be solved in the traditional technology; and the laser range finder combining the laser technology and the electrical technology gains more and more attention in length, height, distance, speed and shape from civil, military and industrial fields, and is widely applied to some fields, such as industrial and mining enterprises, electricity and petrol, water conservancy, communication, environment, architecture, address, police, fire, blasting, navigation, railway, anti-terrorism and military, scientific research institutions, agriculture, garden, real estate, leisure and outdoor sports.

For the laser distance measuring device based on the measurement phase difference principle, the modulated laser beam is adopted to irradiate the measured target, reflected by the measured target and turns back, the phase change in the process of beam reciprocating is converted into the distance of the measured target, which is applied to the distance measurement with short-range and high-precision, and is affected in measurement accuracy and precision by characteristics of internal components of the device. For the distance measuring device, the accuracy requirements are higher, the complexity of the circuit and the demand for precision devices are greatly improved. Therefore, influences of environmental factors such as temperature and service life on the device performance cause that the phase shift of the device is unable to be ignored. The prior art generally uses the phase difference compensation principle of the internal and external light paths to eliminate additional phase shifts of the circuit system, so as to ensure that the measured data are not affected by external environmental factors.

The present invention adopts the calibration method as follows.

(1) A single-transmitting and single-receiving system means that a single path transmits the light beam and a single path receives the light signal; through a controllable mechanical device, the internal light path and the external light path are switched; through calculating the phase value of the internal light path and the external light path before being switched, the phase calibration is performed to eliminate uncertain phase interference. Due to the physically mechanical switch, the mechanical response time is long (generally hundreds of milliseconds level), so that the calibration is not performed in real time; and furthermore, the structure is relatively complex, the mechanical wear and failure are easy to be produced, and the service lift is short. Therefore, the single-transmitting and single-receiving system is not suitable for industrial precision instruments.

(2) A single-transmitting and double-receiving system means that a single path transmits the light beam and double paths respectively receive the signals of the internal light path and the external light path, two paths of received signals are respectively processed and a corresponding phase difference is calculated, so as to eliminate uncertain phase interferences. The system adopts two APDs (Avalanche Photo Diodes) to respectively receive the signals of the internal light path and the external light path. Due to the APD is expensive, the system cost is high.

(3) A traditional double-transmitting and single-receiving system means that two paths separately emit the light beam with the same wavelength, the receiver respectively receives firstly the internal light path signal and then the external light path signal, the received internal light path signal and the external light path signal are processed and a corresponding phase difference is calculated, so as to eliminate uncertain phase interferences. The system adopts two independently photoelectric generating devices to generate two paths of light wave signals with the same wavelength, and however, while working, the two photoelectric generating devices especially the laser tube, due to different working time of the internal light path and the external light path and different laser performances, are easy to produce different temperature drifts, which is unable to be eliminated through the above principle, resulting in the drift of the measuring distance.

In short, the above technical schemes have deficiencies in actual applications.

Moreover, the prior art has some drawbacks as follows.

(1) The prior art adopts one light wave launcher to produce a path of light wave, which utilizes the beam conversion device to change the light path for obtaining the internal light path and the external light path; multiple conversions of the beam conversion device produces the mechanical load, so that the mechanical wear is inevitable; and furthermore, the response time of the circuit is long, the circuit is complex in structure, large in volume and high in cost due to the beam conversion device.

(2) The prior art adopts one light wave launcher to produce a path of light wave, so that the spectroscopic lens is needed to simultaneously produce two paths of light waves, namely, the internal light path and the external light path. Therefore, two APDs are adopted to receive the simultaneously transmitted light waves. The APD wastes the circuit space and its cost is 20% above higher than the present invention.

(3) The prior art adopts the traditional double-transmitting and single-receiving mode, that is, two independent laser tubes generate two paths of light waves and signals to form the internal light path and the external light path, the two paths of light waves and signals are respectively received by the APD to eliminate the phase of the base signal. During the implementation process of the above scheme, due to different working time and working environment in the working process of the double independent laser tubes, the working states of two LDs are different, so that the base signal is unable to be eliminated. Moreover, the LD is larger in discreteness, so that differences between the different tubes also directly cause greater errors.

Based on the above description, the prior art is unable to effectively solve the calibration of the phase measurement.

SUMMARY OF THE PRESENT INVENTION

Aiming at deficiencies of the above-mentioned prior art, the present invention provides a calibration method and a calibration device based on single-wavelength double-laser-tube phase measurement, which avoids environmental changes introducing uncertain noise into the circuit, improves the measurement accuracy of laser ranging, increases the distance measurement stability of the system, reduces influences of environmental factors on distance measurement error, decreases system performance requirements for components, thereby reducing the system cost and strengthening the application of laser ranging in various industries.

Accordingly, in order to accomplish the above objects, the present invention provides a calibration method based on single-wavelength double-laser-tube phase measurement, which comprises steps of:

(S1) generating an external light path via a laser automatic power control circuit through a high frequency modulation signal, sending the external light path to a measured target, reflecting the external light path back through the measured target and receiving the reflected external light path by a photoelectric receiving circuit;

(S2) generating an internal light path via the laser automatic power control circuit through the high frequency modulation signal, directly sending the internal light path to the photoelectric receiving circuit, and receiving the internal light path through the photoelectric receiving circuit; and (S3) performing phase comparison between two paths of light waves respectively corresponding to the external light path and the internal light path which are received firstly and secondly by the photoelectric receiving circuit, and a reference phase signal through the photoelectric receiving circuit, calculating a distance phase, and outputting a signal whose base is eliminated.

Preferably, the calibration method further comprises before the step of (S1), a step of (S0) generating a frequency signal and a local oscillator signal through a frequency synthesizer, processing the frequency signal through high-frequency, obtaining the high frequency modulation signal, and sending the high frequency modulation signal to the laser automatic power control circuit, wherein the external light path and the internal light path are obtained through the high frequency modulation signal via the laser automatic power control circuit.

Preferably, the stable reference phase signal in the step of (S3) is obtained through mixing the internal light path, the external light path and the local oscillator signal.

Preferably, in the step of (S3), the two paths of light waves, respectively corresponding to the external light path and the internal light path which are received by the photoelectric receiving circuit, are firstly amplified by a low-frequency signal and then performed the phase comparison with the reference phase signal.

Preferably, through the laser automatic power control circuit, an emitted laser power is unchanged in an ambient temperature range of −10° C. to 50° C.

In order to accomplish the above objects, the present invention also provides a calibration device based on single-wavelength double-laser-tube phase measurement, which comprises: a frequency synthesizer, a high frequency processing control processor, a laser automatic power control circuit, a photoelectric receiving circuit, a low frequency signal amplifier, a main controller and a mixer; wherein:

the frequency synthesizer generates and outputs a frequency signal and a local oscillator signal; the mixer mixes an internal light path and an external light path with the local oscillator signal to obtain a stable reference phase signal; the laser automatic power control circuit switches the external light path and the internal light path; the low frequency signal amplifier amplifies an output signal of the photoelectric receiving circuit and then sends the amplified output signal to the main controller;

the frequency synthesizer is connected with the high frequency processing control processor to output a high frequency modulation signal, the external light path and the internal light path are obtained through the high frequency modulation signal via the laser automatic power control circuit; the external light path is emitted to a measured target and then reflected back to be received by the photoelectric receiving circuit; the internal light path is directly sent to the photoelectric receiving circuit to be received; the low frequency signal amplifier amplifies two paths of light waves respectively corresponding to the external light path and the internal light path which are firstly and secondly received by the photoelectric receiving circuit, and then outputs to the main controller; the reference phase signal in the mixer is respectively performed phase comparison with the amplified two paths of light waves to calculate a distance phase, and a signal whose base is eliminated is outputted.

Preferably, the signal whose base is eliminated is sent to a speaker through a voice play circuit and then is reported in real voice; the signal whose base is eliminated is also sent to an intelligent terminal equipment through a Bluetooth transmitter circuit and measured distance data are wirelessly transmitted in real time to the intelligent terminal equipment.

Preferably, the laser automatic power control circuit comprises a first triode, a second triode, a first laser diode, a second laser diode, a first sampling diode and a second sampling diode; a working voltage is introduced into a common terminal of the first laser diode and the first sampling diode, also introduced into a common terminal of the second laser diode and the second sampling diode, and a common terminal of the first sampling diode and the second sampling diode is connected with a base of the second triode; the first laser diode is connected with the high frequency processing controller to receive the high frequency modulation signal generated by the high frequency processing controller, a collector of both the second laser diode and the first triode is connected between the first laser diode and the high frequency processing controller; the working voltage is introduced into a base of the first triode through a first resistor; an emitter of the second triode is connected with ground, a collector of the second triode is connected between the first resistor and the first triode;

when an ambient temperature is increased, a current of both the first laser diode and the second laser diode is increased, a voltage sampled by both the first sampling diode and the second sampling diode is decreased, an IB bias current for the second triode is decreased, an IC current amplification of the second triode is correspondingly decreased, an IB bias current for the first triode is increased, an IC current amplification of the first triode is deepened, so that a luminous power of laser is unchanged;

when the ambient temperature is decreased, the current of both the first laser diode and the second laser diode is decreased, the voltage sampled by both the first sampling diode and the second sampling diode is increased, the IB bias current for the second triode is increased, the IC current amplification of the second triode is correspondingly increased, the IB bias current for the first triode is decreased, the IC current amplification of the first triode is decreased, so that the luminous power of laser is also unchanged.

Preferably, an emitter of the first triode is connected with ground through a second resistor, a capacitor is connected between the first resistor and the base of the first triode, the base of the second triode is connected with ground through a third resistor.

Preferably, the photoelectric receiving circuit is a photoelectric diode, a photoelectric triode, an avalanche transistor or a photomultiplier tube.

Beneficially effects of the present invention are as follows. Compared with the prior art, in the calibration method based on single-wavelength double-laser-tube phase measurement and the calibration device provided by the present invention, the high frequency modulation signal is switched through the laser automatic power control circuit to obtain the external light path and the internal light path, and then the return signal of the external light path and the internal light path signal are respectively received by the photoelectric receiving circuit, and then both the return signal of the external light path and the internal light path signal are performed the phase comparison with the reference phase signal to eliminate additional phase shift, thereby achieving phase error compensation and calibration; and simultaneously, the internal light path and the external light path are switched through the laser automatic power control circuit to more stably and efficiently achieve the phase error compensation and calibration, so as to reduce the influence of environmental factors on ranging errors, improve the measurement accuracy of laser ranging, increase the ranging stability of the system and reduce the performance requirements of the system for components, thus reducing the system cost and strengthening the application of laser ranging in various industries.

Main components are described as follows:
10: frequency synthesizer; 11: high frequency processing control processor; 12: laser automatic power control circuit; 13: photoelectric receiving circuit; 14: low frequency signal amplifier; 15: main controller; 16: mixer: 17: voice play circuit; 18: speaker; 19: Bluetooth transmitter circuit; 20: external light path; 21: internal light path.

DETAILED DESCRIPTION OF THE PREFERRED EMBODIMENT

To more clearly explain the present invention, the present invention is further described with accompanying drawings as follows.

Figure 1:
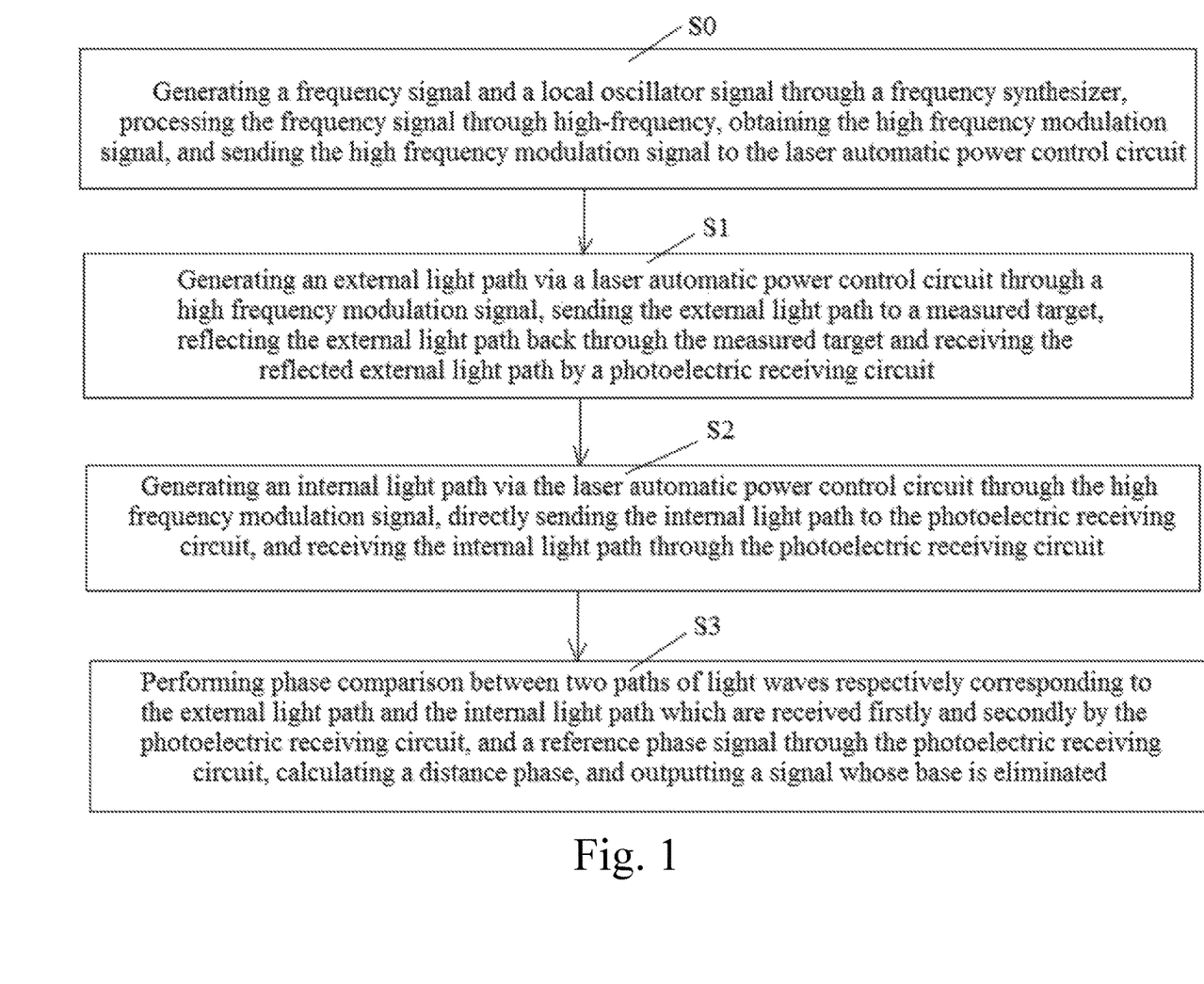
FIG. 1 is a flow chart of a calibration method based on single-wavelength double-laser-tube phase measurement according to a preferred embodiment of the present invention.

Referring to FIG. 1, a calibration method based on single-wavelength double-laser-tube phase measurement is illustrated, which comprises steps of:

(S0) generating a frequency signal and a local oscillator signal through a frequency synthesizer, processing the frequency signal through high-frequency, obtaining a high frequency modulation signal, and sending the high frequency modulation signal to a laser automatic power control circuit;

(S1) generating an external light path through the laser automatic power control circuit via the high frequency modulation signal, sending the external light path to a measured target, reflecting the external light path back through the measured target and receiving the reflected external light path by a photoelectric receiving circuit;

(S2) generating an internal light path through the laser automatic power control circuit via the high frequency modulation signal, directly sending the internal light path to the photoelectric receiving circuit, and receiving the internal light path through the photoelectric receiving circuit, so that the internal light path and the external light path are obtained through the laser automatic power control circuit via the high frequency modulation signal; and (S3) performing phase comparison between two paths of light waves respectively corresponding to the external light path and the internal light path which are received firstly and secondly, and a reference phase signal through the photoelectric receiving circuit, calculating a distance phase, outputting a signal whose base is eliminated, wherein: the reference phase signal is obtained by frequency-mixing the internal and external light paths and the local oscillator signal; the two paths of light waves, respectively corresponding to the external light path and the internal light path which are received firstly and secondly by the photoelectric receiving circuit, are firstly amplified by a low-frequency signal and then performed the phase comparison with the reference phase signal.

Compared with the prior art, in the calibration method based on single-wavelength double-laser-tube phase measurement, provided by the present invention, the external light path and the internal light path are obtained through the high-frequency modulation signal via the laser automatic power control circuit; and then a return signal of the external light path and a signal of the internal light path are respectively received by the photoelectric receiving circuit, and are performed the phase comparison with the reference phase signal, so as to eliminate additional phase shifts, for achieving phase error compensation and calibration; and simultaneously, the internal light path and the external light path are switched through the laser automatic power control circuit to more stably and efficiently achieve the phase error compensation and calibration, so as to reduce the influence of environmental factors on ranging errors, improve the measurement accuracy of laser ranging, increase the ranging stability of the system and reduce the performance requirements of the system for components, thus reducing the system cost and strengthening the application of laser ranging in various industries.

Figure 2:
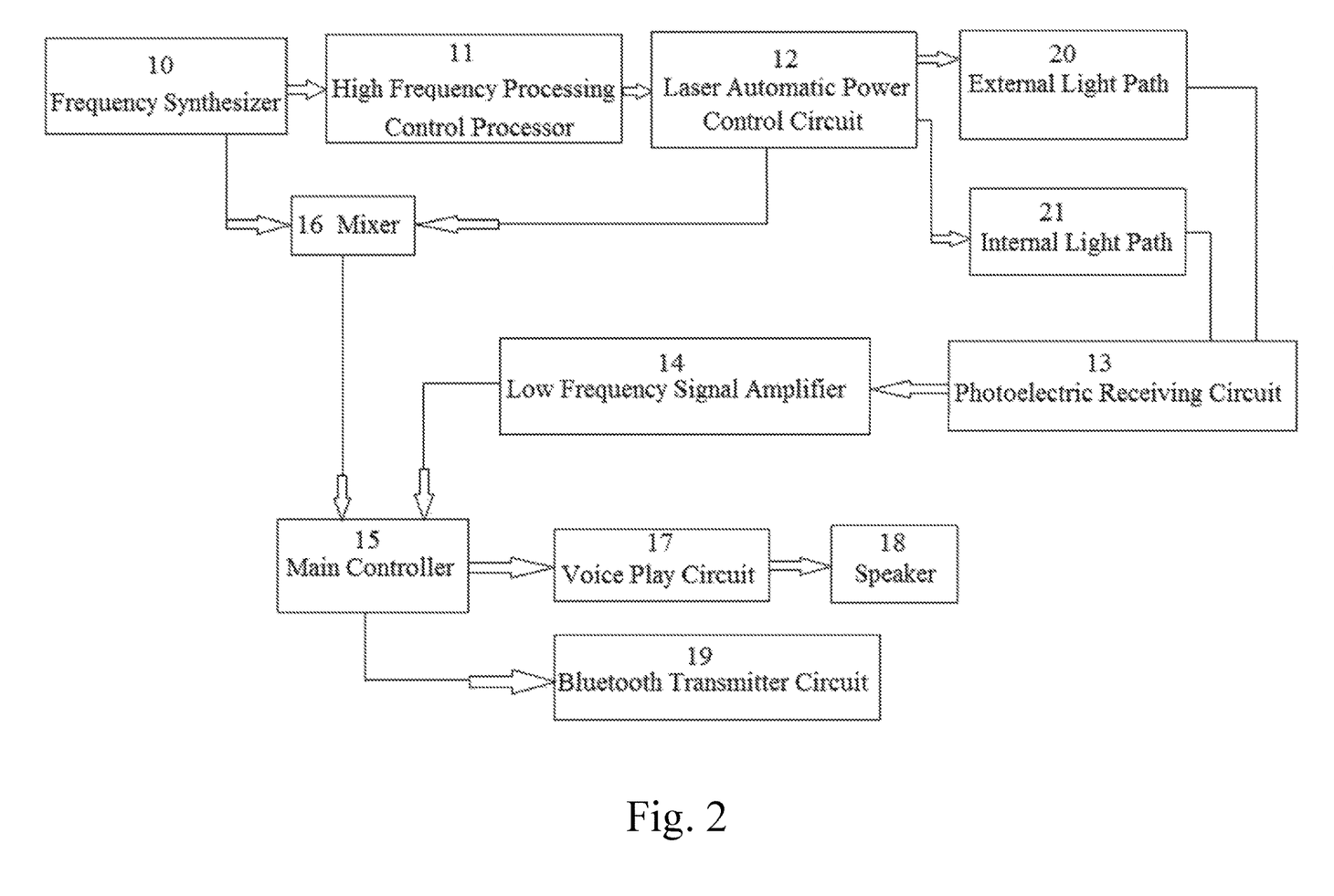
FIG. 2 is a structurally schematic view of a calibration device based on single-wavelength double-laser-tube phase measurement according to the above preferred embodiment of the present invention.

In this embodiment, the laser automatic power control circuit 12 is adopted to maintain the emitted laser power is unchanged at an ambient temperature range of −10° C. to 50° C. In the absence of any compensation situation, the measurement accuracy is unchanged in a wide working environment. The internal light path and the external light path for phase comparison are light waves which are obtained through frequency-mixing a mixed-signal, and are two paths of high frequency modulation signals with a same phase or a stable phase difference.

Further referring to FIG. 2, the present invention also provides a calibration device based on single-wavelength double-laser-tube phase measurement, which comprises a frequency synthesizer 10, a high frequency processing control processor 11, a laser automatic power control circuit 12, a photoelectric receiving circuit 13, a low frequency signal amplifier 14, a main controller 15 and a mixer 16; wherein:

the frequency synthesizer 10 generates and outputs a frequency signal and a local oscillator signal; the mixer 16 mixes an internal light path 21 and an external light path 20 with the local oscillator signal to obtain a stable reference phase signal; the laser automatic power control circuit 12 switches the external light path 20 and the internal light path 21; the low frequency signal amplifier 14 amplifies an output signal of the photoelectric receiving circuit 13 and then sends the amplified output signal to the main controller 15;

the frequency synthesizer 10 is connected with the high frequency processing control processor 11 to output a high frequency modulation signal, the external light path 20 and the internal light path 21 are obtained through the high frequency modulation signal via the laser automatic power control circuit 12, the external light path 20 is emitted to a measured target and then reflected back to be received by the photoelectric receiving circuit 13, the internal light path is directly sent to the photoelectric receiving circuit 13 to be received; the low frequency signal amplifier 14 amplifies the two light waves respectively corresponding to the external light path 20 and the internal light path 21 which are firstly and secondly received by the photoelectric receiving circuit 13, and then outputs to the main controller 15; the reference phase signal in the mixer 16 is respectively performed the phase comparison with the amplified two paths of light waves to calculate a distance phase and output a signal whose base is eliminated.

Compared with the prior art, in the calibration device based on single-wavelength double-laser-tube phase measurement, provided by the present invention, the high frequency modulation signal is obtained through combining the frequency synthesizer 10 with the high frequency processing control processor 11, the external light path and the internal light path are obtained through the high frequency modulation signal via the laser automatic power control circuit, the photoelectric receiving circuit respectively receives a return signal of the external light path and a signal of the internal light path, and performs the phase comparison between the return signal of the external light path and the signal of the internal light path with the reference phase signal, so as to eliminate additional phase shifts, for achieving phase error compensation and calibration; and simultaneously, the laser automatic power control circuit is adopted to switch the internal light path and the external light path to more stably and efficiently achieve the phase error compensation and calibration, so as to reduce the influence of environmental factors on ranging errors, improve the measurement accuracy of laser ranging, increase the ranging stability of the system and reduce the performance requirements of the system for components, thus reducing the system cost and strengthening the application of laser ranging in various industries.

In this embodiment, the signal, whose base is eliminated, is sent to a speaker 18 through a voice play circuit 17 and then is reported in real voice; the signal whose base is eliminated is also sent to an intelligent terminal equipment through a Bluetooth transmitter circuit 19 and measured distance data are wirelessly transmitted in real time to the intelligent terminal equipment. The present invention also has an advantage that the main controller controls the voice play circuit for allowing the speaker to report the measured results and various operational menus in real voice, so that the working efficiency is greatly improved, which is convenient and fast. Bluetooth function: the main controller controls the Bluetooth transmitter circuit to wirelessly transmit measured distance data in real time to the intelligent terminal devices which comprise PCs, mobile phones and iPads. Simultaneously, if the Bluetooth protocol of the present invention is obtained, the third party is able to develop APP systems for different fields, which is more intelligent.

Figure 3:
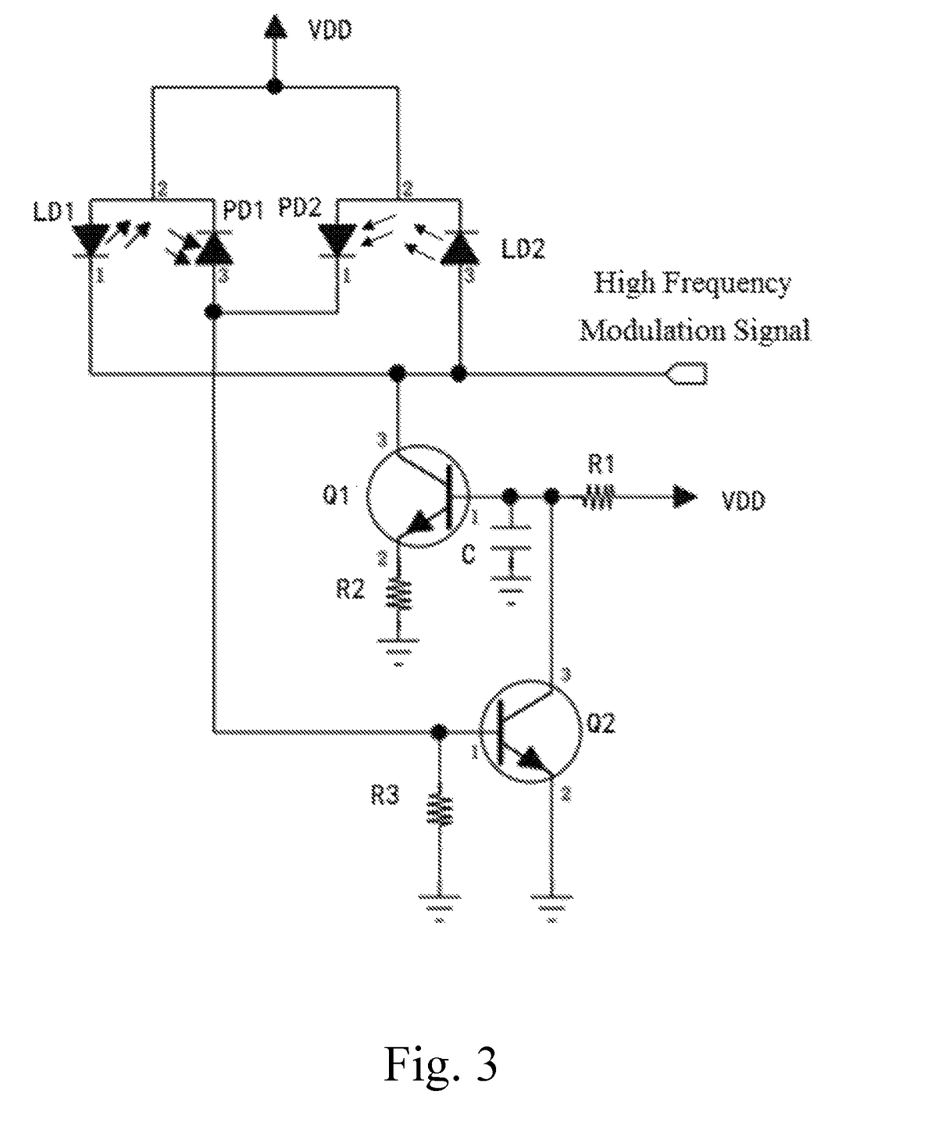
FIG. 3 is a circuit diagram of a laser automatic power control circuit according to the above preferred embodiment of the present invention.

Referring to FIG. 3, the laser automatic power control circuit 12 comprises a first triode Q1, a second triode Q2, a first laser diode LD1, a second laser diode LD2, a first sampling diode PD1 and a second sampling diode PD2; a working voltage VDD is introduced into a common terminal of the first laser diode LD1 and the first sampling diode PD1, also introduced into a common terminal of the second laser diode LD2 and the second sampling diode PD2, and a common terminal of the first sampling diode LD2 and the second sampling diode PD2 is connected with a base of the second triode Q2; the first laser diode LD1 is connected with the high frequency processing controller 11 to receive the high frequency modulation signal generated by the high frequency processing controller 11, a collector of both the second laser diode LD2 and the first triode Q1 is connected between the first laser diode LD1 and the high frequency processing controller 11; the working voltage VDD is introduced into a base of the first triode Q1 through a first resistor R1; an emitter of the second triode Q2 is connected with ground, a collector of the second triode Q2 is connected between the first resistor R1 and the first triode Q1;

when an ambient temperature is increased, a current of both the first laser diode LD1 and the second laser diode LD2 is increased, a voltage sampled by both the first sampling diode PD1 and the second sampling diode PD2 is decreased, an IB bias current for the second triode Q2 is decreased, an IC current amplification of the second triode Q2 is correspondingly decreased, an IB bias current for the first triode Q1 is increased, an IC current amplification of the first triode Q1 is deepened, so that a luminous power of laser is unchanged;

when the ambient temperature is decreased, the current of both the first laser diode LD1 and the second laser diode LD2 is decreased, the voltage sampled by both the first sampling diode PD1 and the second sampling diode PD2 is increased, the IB bias current for the second triode Q2 is increased, the IC current amplification of the second triode Q2 is correspondingly increased, the IB bias current for the first triode Q1 is decreased, the IC current amplification of the first triode Q1 is decreased, so that the luminous power of laser is also unchanged.

An emitter of the first triode Q1 is connected with ground through a second resistor R2, a capacitor C is connected between the first resistor R1 and the base of the first triode Q1, the base of the second triode Q2 is connected with ground through a third resistor R3. The photoelectric receiving circuit 13 is a photoelectric diode, a photoelectric triode, an avalanche transistor or a photomultiplier tube; or other devices with photoelectric conversion function.

Compared with the prior art, in the present invention, the laser automatic power control circuit is adopted to control the internal light path and the external light path, which avoids the use of mechanical switch; the control circuit is adopted to obtain fast response time and small interval between receiving the internal optical signal and external optical signal; and furthermore, the switching time interval is millisecond level, so that it is able to be regarded that the surroundings of the switching components of the circuit are unchanged, the circuit is not affected, and the measurement accuracy is not affected. Compared with the double-APD scheme and the double-LD scheme, the present invention provides the dual-core-packaged single-chip dual-wavelength laser tube, the common-mode influence of the APD and LD themselves are completely eliminated through the switching of the internal light path and the external light path, and the calibration of the dual-wavelength laser, thereby obtaining higher accuracy than double-APD scheme and the double-LD scheme.

The above disclosure is merely a few embodiments of the present invention, but the present invention is not limited thereto, and any changes that may be made by those skilled in the art are intended to fall within the scope of the present invention.

What is claimed is:

1. A calibration device based on single-wavelength double-laser-tube phase measurement, comprising: a frequency synthesizer, a high frequency processing control processor, a laser automatic power control circuit, a photoelectric receiving circuit, a low frequency signal amplifier, a main controller and a mixer; wherein:

the frequency synthesizer generates and outputs a frequency signal and a local oscillator signal; the mixer mixes an internal light path and an external light path with the local oscillator signal to obtain a stable reference phase signal; the laser automatic power control circuit switches the external light path and the internal light path; the low frequency signal amplifier amplifies an output signal of the photoelectric receiving circuit and then sends the amplified output signal to the main controller;

the frequency synthesizer is connected with the high frequency processing control processor to output a high frequency modulation signal, the external light path and the internal light path are obtained through the high frequency modulation signal via the laser automatic power control circuit; the external light path is emitted to a measured target and then reflected back to be received by the photoelectric receiving circuit; the internal light path is directly sent to the photoelectric receiving circuit to be received; the low frequency signal amplifier amplifies two paths of light waves respectively corresponding to the external light path and the internal light path which are firstly and secondly received by the photoelectric receiving circuit, and then outputs to the main controller; the reference phase signal in the mixer is respectively performed phase comparison with the amplified two paths of light waves to calculate a distance phase, and a signal whose base is eliminated is outputted;

the signal whose base is eliminated is sent to a speaker through a voice play circuit and then is reported in real voice; the signal whose base is eliminated is also sent to an intelligent terminal equipment through a Bluetooth transmitter circuit and measured distance data are wirelessly transmitted in real time to the intelligent terminal equipment.

2. A calibration device based on single-wavelength double-laser-tube phase measurement, comprising: a frequency synthesizer, a high frequency processing control processor, a laser automatic power control circuit, a photoelectric receiving circuit, a low frequency signal amplifier, a main controller and a mixer; wherein:

the frequency synthesizer generates and outputs a frequency signal and a local oscillator signal; the mixer mixes an internal light path and an external light path with the local oscillator signal to obtain a stable reference phase signal; the laser automatic power control circuit switches the external light path and the internal light path; the low frequency signal amplifier amplifies an output signal of the photoelectric receiving circuit and then sends the amplified output signal to the main controller;

the frequency synthesizer is connected with the high frequency processing control processor to output a high frequency modulation signal, the external light path and the internal light path are obtained through the high frequency modulation signal via the laser automatic power control circuit; the external light path is emitted to a measured target and then reflected back to be received by the photoelectric receiving circuit; the internal light path is directly sent to the photoelectric receiving circuit to be received; the low frequency signal amplifier amplifies two paths of light waves respectively corresponding to the external light path and the internal light path which are firstly and secondly received by the photoelectric receiving circuit, and then outputs to the main controller; the reference phase signal in the mixer is respectively performed phase comparison with the amplified two paths of light waves to calculate a distance phase, and a signal whose base is eliminated is outputted;

the laser automatic power control circuit comprises a first triode, a second triode, a first laser diode, a second laser diode, a first sampling diode and a second sampling diode;

a working voltage is introduced into a common terminal of the first laser diode and the first sampling diode, also introduced into a common terminal of the second laser diode and the second sampling diode, and a common terminal of the first sampling diode and the second sampling diode is connected with a base of the second triode; the first laser diode is connected with the high frequency processing controller to receive the high frequency modulation signal generated by the high frequency processing controller, a collector of both the second laser diode and the first triode is connected between the first laser diode and the high frequency processing controller; the working voltage is introduced into a base of the first triode through a first resistor; an emitter of the second triode is connected with ground, a collector of the second triode is connected between the first resistor and the first triode;

when an ambient temperature is increased, a current of both the first laser diode and the second laser diode is increased, a voltage sampled by both the first sampling diode and the second sampling diode is decreased, an IB bias current for the second triode is decreased, an IC current amplification of the second triode is correspondingly decreased, an IB bias current for the first triode is increased, an IC current amplification of the first triode is deepened, so that a luminous power of laser is unchanged;

when the ambient temperature is decreased, the current of both the first laser diode and the second laser diode is decreased, the voltage sampled by both the first sampling diode and the second sampling diode is increased, the IB bias current for the second triode is increased, the IC current amplification of the second triode is correspondingly increased, the IB bias current for the first triode is decreased, the IC current amplification of the first triode is decreased, so that the luminous power of laser is also unchanged.

3. The calibration device based on single-wavelength double-laser-tube phase measurement, as recited in claim 2, wherein an emitter of the first triode is connected with ground through a second resistor, a capacitor is connected between the first resistor and the base of the first triode, the base of the second triode is connected with ground through a third resistor.

4. The calibration device based on single-wavelength double-laser-tube phase measurement, as recited in claim 2, wherein the photoelectric receiving circuit is a photoelectric diode, a photoelectric triode, an avalanche transistor or a photomultiplier tube.

* * * * *